(12) United States Patent
Lewis et al.

(10) Patent No.: US 9,641,574 B1
(45) Date of Patent: May 2, 2017

(54) GENERATING CONNECTION RECOMMENDATIONS ON A SOCIAL NETWORK USING SOCIAL CONTACTS

(71) Applicant: Google Inc., Mountain View, CA (US)

(72) Inventors: Justin Lewis, Marina Del Ray, CA (US); Ruxandra Georgiana Paun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 638 days.

(21) Appl. No.: 13/912,507

(22) Filed: Jun. 7, 2013

(51) Int. Cl.
*G06F 15/16* (2006.01)
*H04L 29/06* (2006.01)

(52) U.S. Cl.
CPC .................................. *H04L 65/403* (2013.01)

(58) Field of Classification Search
CPC ...................................................... H04L 65/403
USPC ........................................ 709/204, 205, 206
See application file for complete search history.

(56) References Cited

U.S. PATENT DOCUMENTS

| | | | |
|---|---|---|---|
| 9,088,620 B2 * | 7/2015 | Balakrishnan | H04L 67/22 |
| 2010/0229223 A1 * | 9/2010 | Shepard | G06F 21/31 726/5 |
| 2012/0303415 A1 * | 11/2012 | Edelson | G06Q 30/0282 705/7.32 |
| 2013/0124322 A1 * | 5/2013 | Boland | G06Q 30/0255 705/14.58 |
| 2014/0108550 A1 * | 4/2014 | Rubinstein | G06Q 10/107 709/204 |
| 2014/0310013 A1 * | 10/2014 | Ram | G06Q 50/24 705/2 |
| 2015/0334439 A1 * | 11/2015 | Zhang | H04N 21/235 725/18 |

* cited by examiner

*Primary Examiner* — Viet Vu
(74) *Attorney, Agent, or Firm* — Lowenstein Sandler LLP

(57) ABSTRACT

A method for generating connection recommendations for a social network from social contacts is disclosed. The method includes identifying a first user of a content sharing platform, selecting a second user of the content sharing platform based on an affinity score between the first user and the second user, wherein the first user and the second user are not connected on the content sharing platform, contacting the second user to request a list of recommended subscriptions on the content sharing platform for the first user, receiving, from the second user, the list of recommended subscriptions for the first user, and providing, to the first user, at least a portion of the list of recommended subscriptions as suggestions for subscriptions on the content sharing platform for the first user.

20 Claims, 8 Drawing Sheets

500

```
Identify first user of content sharing platform, where the first user is a new user
to the content sharing platform
                                                                            510
```

```
Identify social contacts of the first user that are users of the content sharing
platform but not connected to the first user on the content sharing platform
                                                                            520
```

```
Determine affinity score between the first user and each of the social contacts
based on interactions between the first user and the social contact external to
the content sharing platform
                                                                            530
```

```
Select one or more of the identified social contacts based on the determined
affinity scores
                                                                            540
```

```
Contact each of the selected social contacts to request channel
recommendations on the content sharing platform for the first user
                                                                            550
```

```
Provide, to the first user, the channel recommendations received from the
selected social contacts as suggestions for channel subscriptions for the first
user to make on the contact sharing platform
                                                                            560
```

```
Subscribing the first user to one or more channels indicated by the first user
from the provided channel subscription suggestions
                                                                            570
```

Determine that User B is a social contact of User A external to a content sharing platform, where User A is not connected to User B on the content sharing platform
605

Contact User B to request channel recommendations for User A for a content sharing platform
610

User B indicate willingness to provide channel recommendations for User A?
615

NO → END

YES

Provide first GUI to User B including current channel subscriptions of User B
620

Receive indication of selection, made by User B via the first GUI, of one or more channels recommended for User A
625

GENERATING CONNECTION RECOMMENDATIONS ON A SOCIAL NETWORK USING SOCIAL CONTACTS

TECHNICAL FIELD

This disclosure relates to the field of multimedia content and, in particular, to generating connection recommendations on a social network using social contacts.

BACKGROUND

On the Internet, social networks, such as content sharing platforms or other services, allow users to upload, view, and share digital content. The digital content may include media items, such as audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

The content sharing platforms can include one or more channels or one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. Upon subscribing, the user can view his or her subscriptions on a user interface by selecting a "Subscriptions" link/button. With many channels associated with content sharing platforms or viewable over the Internet, it may be difficult for a new user to the content sharing platform to find new media items to consume, to find new channels to subscribe to, and/or to decide which channels to subscribe to.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for generating connection recommendations for a social network from social contacts is disclosed. The method includes identifying a first user of a content sharing platform, selecting a second user of the content sharing platform based on an affinity score between the first user and the second user, wherein the first user and the second user are not connected on the content sharing platform, contacting the second user to request a list of recommended subscriptions on the content sharing platform for the first user, receiving, from the second user, the list of recommended subscriptions for the first user, and providing, to the first user, at least a portion of the list of recommended subscriptions as suggestions for subscriptions on the content sharing platform for the first user.

The method described above may also include the identifying the first user further comprising determining that a number of subscriptions of the first user on the content sharing platform is less than a subscription threshold. In addition, the affinity score is based on a number of connections made between the first user and the second user using at least one of a social connection network external to the content sharing platform, electronic mail communications, telephone communications, SMS communications, and MMS communications. Furthermore, the affinity score is further based on a frequency of the number of connections made between the first user and the second user.

In another implementation, a subscription comprises a channel of the content sharing platform. The method may further include receiving, from the first user, a selection of a subscription from the list of recommended subscriptions. In addition, contacting the second user may further comprise sending the second user a pre-populated list of subscriptions comprising subscriptions associated with the second user. Furthermore, the affinity score between the first user and the second user exceeds an affinity score threshold. Similarly, in one implementation, the affinity score between the first user and the second user comprises a top predetermined number of affinity scores for the first user.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 5 is a flow diagram illustrating a method for generating connection recommendations for a social network from social contacts according to some implementations of the disclosure.

FIGS. 6A and 6B re flow diagrams illustrating another method for generating connection recommendations for a social network from social contacts according to an implementation of the disclosure.

DETAILED DESCRIPTION

Figure 1:
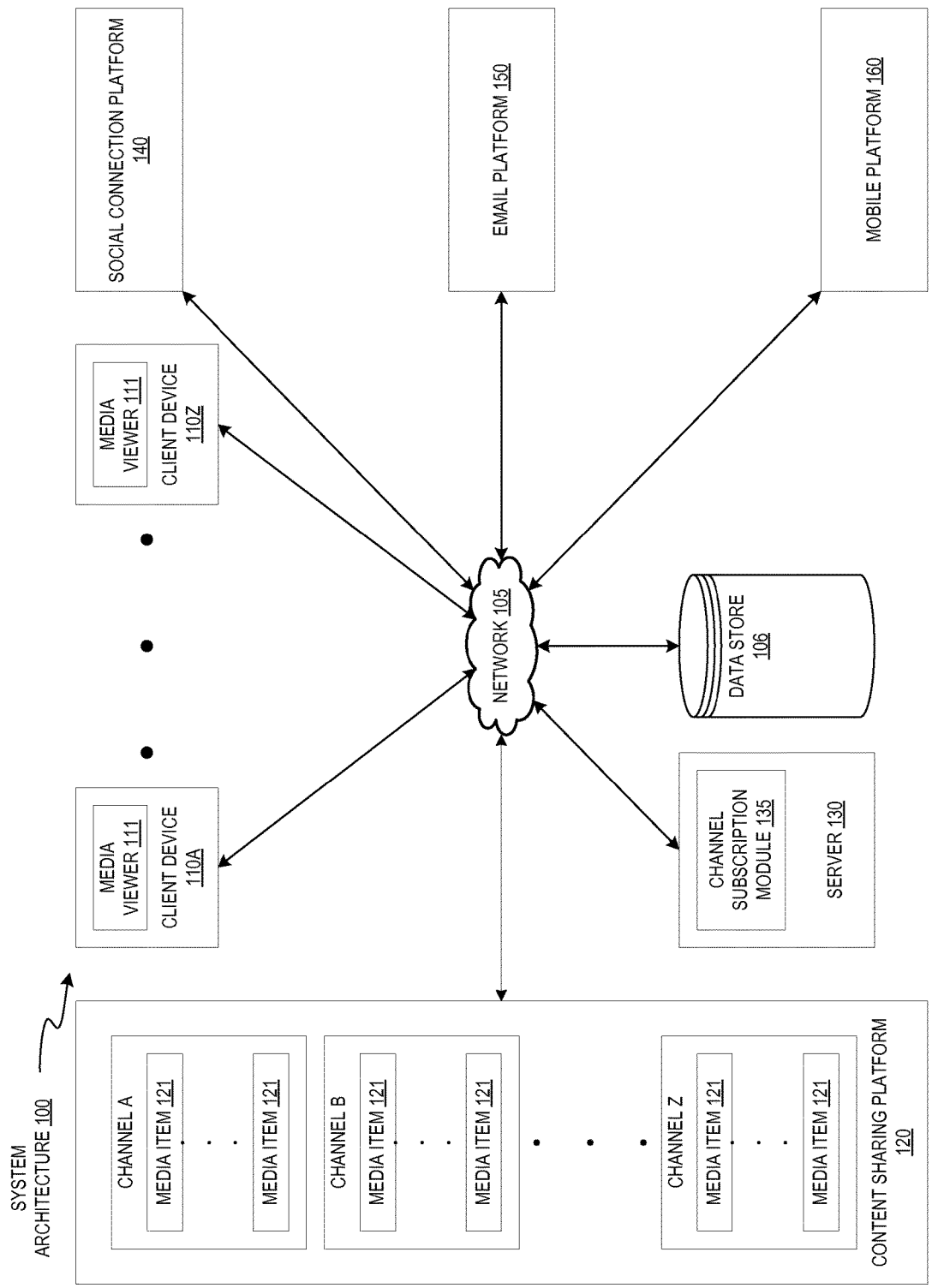
FIG. 1 illustrates an example system architecture, in accordance with one implementation of the present disclosure.

Implementations are described for generating connection recommendations on a social network using social contacts. Implementations of the disclosure pertain to subscribing users to channels on a social network. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel (e.g., a list of actions, such as adding a new media item, associated with each channel). An activity feed is a list of recent activity associated with the user and occurring on the social network.

Users, other than the owner of the channel, can subscribe to one or more channels in which they are interested. Because of the large number of media items and channels that are currently available on the Internet (e.g., the Web and/or other networks), users may often have difficulty finding new media items to consume. Implementations of the disclosure may identify one or more recommended channels for a user based on recommendations made by social contacts of the user, where the user is not connected to the social contacts on the social network. The social network may determine a level of interaction between a first user and other users of the social network, to which the first user is not connected, by analyzing interactions between the users on, for example, another social network, an email platform, and/or a mobile platform. The social network may contact the identified other users that have a high level of interaction to the first user and request channel recommendations for the first user from those other users. When channel recommendations are received from the other users, the social network may then provide those recommendations as suggestions to the first user, and subscribe the first user to any of those channels that the first user selects.

Previously, social networks relied on existing connections between users to obtain channel recommendations for a user. Implementations of the disclosure allow a social network to identify other social interactions of a first user, outside of the social network, and to identify other users of the social network to which the first user is not connected in order to obtain subscription recommendations for the first user with respect to the social network. This can create high-quality recommendations for users of the social network where they otherwise would not be available.

FIG. 1 illustrates an example system architecture 100, in accordance with one implementation of the present disclosure. The system architecture 100 includes client devices 110A through 110Z, a network 105, a data store 106, a content sharing platform 120, a server 130, a social connection platform 140, an email platform 150, and a mobile platform 160. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," and a "digital media item" can include an electronic file that can be executed or loaded using software, firmware or hardware configured to present the digital media item to an entity. In one implementation, the content sharing platform 120 may store the media items 121 using the data store 106.

Social connection platform 140 may be one or more computing devices (e.g., servers), data stores, networks, software components, and/or hardware components that may be used to allow users to connect to, share information, and/or interact with each other. A social connection platform 140 may present to a user a listing (e.g., activity feed, feed, stream, wall, etc.) of objects (such as posts, content items (e.g., video, images, audio, etc.), status updates, favorability indications, tags, messages, and so on) generated by other users of the social network. The social connection platform 140 may also include a content sharing aspect that allow users to upload, view, tag, and share content, such as text content, video content, image content, audio content, and so on. Other users of the social connection platform 140 may comment on the shared content, discover new content, locate updates, share content, and otherwise interact with the provided content.

In one implementation, the content sharing platform 120 may be integrated with the social connection platform 140. For example, the social connection platform 140 may use the content sharing platform 120 to allow users to upload and/or share content. In another implementation, the social connection platform 140 may be separate from the content sharing platform 120. In one implementation, the social connection platform 140 may also include chat functionality (e.g., a chat platform) to allow users to chat with (e.g., to instant message) each other.

In one implementation, email platform 150 may be one or more computing devices (e.g., servers), data stores, networks, software components, and/or hardware components that may be used to allow users to send and/or receive electronic-mail (emails) to each other. For example, a first user may use the email platform 150 to send an email to a second user regarding the time and location of a particular event. The first user may also attached files (e.g., video files, image files, text files, etc.) to the email. In one implementation, the email platform 150 may also include chat functionality (e.g., a chat platform) to allow users to chat with (e.g., to instant message) each other.

In another implementation, the mobile platform 160 may be one or more computing devices (e.g., servers), data stores, networks, software components, and/or hardware components that are used to allow users to connect to, share information, and/or interact with each other using one or more mobile device, smart phones, tablet devices, and other mobile communication devices that allow users to communicate over a telecommunications network. For example, the mobile platform 160 may enable telephony communication, Short Message Service (SMS) messaging, Multimedia Message Service (MMS) messaging, text chat, and video chat between users.

In one implementation, the server 130 may be one or more computing devices (e.g., a rackmount server, a server computer, etc.). In one implementation, the server 130 may be included in one or more of the content sharing platform 120, the social connection platform 140, the email platform 150, and the mobile platform 160. In another implementation, the server 130 may be separate from the content sharing platform 120, the social connection platform 140, the email platform 150, and the mobile platform 160 but may communicate (e.g., exchange data with) the content sharing platform 120, the social connection platform 140, the email platform 150, and the mobile platform 160.

In one implementation, the server 130 includes a channel subscription module 135. The channel subscription module 135 may generate connection recommendations for a user on a social network using social contacts of the user. For example, channel subscription module 135 may generate subscription recommendations for a target user, such as a new user, of the content sharing platform 120 using social connections of the target user, where the target user is not connected to the social connections on the content sharing platform 120. This may allow the target user to more easily find new channels and/or media items to consume (e.g., to view) upon joining the social network of the content sharing platform 120. In other implementations, the target user may not be a new user in terms of time passed since joining the content sharing platform 120, but may have a number of subscriptions that falls below a threshold subscription number value.

In one implementation, the channel subscription module 135 may identify channels for recommendation to the user by analyzing interactions between the user and other users of the content sharing platform 120 to which the user is not connected (e.g., subscribed) on the content sharing platform 120. The channel subscription module 135 may determine a level of interaction between the user and other users of the content sharing platform 120 to which the user is not connected by analyzing interaction between the users on, for example, the social connection platform 140, the email platform 150, and the mobile platform 160. For example, the channel subscription module 135 may obtain (e.g., may determine or calculate) an affinity score between two users that are not connected on the content sharing platform 120. In one implementation, an affinity score is an indication of a level of interaction between the two users outside of the content sharing platform 120 (e.g., on the social connection platform 140, the email platform 150, and the mobile platform 160).

For example, an affinity score may be calculated by looking at explicit actions that users take (e.g., clicking, liking (providing a positive feedback), commenting, tagging (e.g., assigning an identifier to a piece of information), sharing, friending (requesting to be a friend), etc.) on the social connection platform 140, and factoring in the strength of the action, how "connected" the user who took the action was to the target user (e.g., how many mutual connections they share, etc.), and how long ago they took the action.

In addition, other factors such as mode of communication, frequency of communications, and so on, on the email platform 150 and/or the mobile platform 160 may be taken into consideration for determining an affinity score. Note that an affinity score may be a one-way score (e.g., not reciprocal). In other words, a first user's affinity score for a second user is not necessarily the same as the second user's affinity score for the first user. The affinity score may be any number, text, and/or value that may be used to indicate the level of interaction between two users. For example, the affinity score may be a numerical value from 0 to 1 (e.g., 0.8) where a value of 0 indicates no connection between two users and a value of 1 indicates a very high level of interaction between two users. In another example, the affinity score may be a numerical value from 1 to 10, or 1 to 100, where a higher number indicates a higher level of interaction between two users.

The channel subscription module 135 may obtain affinity scores for a first user and multiple other users by analyzing interactions between a first user and the other users. The channel subscription module 135 may identify one or more users with which the first user has higher affinity scores (e.g., may identify which of the other users the first user interacts more with) and may request recommendations for channel subscriptions for the first user from the one or more users. For example, the channel subscription module 135 may identify channels that belong to the one or more users. In another example, the channel subscription module 135 may identify channels that the one or more users are subscribed to and/or have accessed. The channel subscription module 135 may then request the one or more users to select one or more of the identified channels as recommended channel subscriptions for the first user. The one or more users may rely on their personal knowledge and connections with the first user to determine which channel subscriptions that the first user may be interested in and recommend these channels for the first user.

The channel subscription module 135 may communicate with one or more of the content sharing platform 120, the social connection platform 140, the email platform 150, and the mobile platform 160, and may analyze the content of interactions between the user and other users. The content sharing platform 120 may also store the analyzed information in one or more data stores 106 (e.g., hard disks, memories, databases, etc.). In one implementation, the channel subscription module 135 may, based on the analyzing, contact one or more other users of the content sharing platform 120 to which the first user is not connected, in order to obtain channel subscription recommendations for the first user from the one or more other users.

In situations in which the systems discussed here collect personal information about users, or may make use of personal information, the users may be provided with an opportunity to control whether the channel subscription module 135 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the channel subscription module 135.

For example, the channel subscription module 135 may analyze the details and subject matter of user interactions such as emails, chat messages (e.g., instant messages), text messages, SMS messages, MMS messages, telephone calls, posts on walls of the social connection platform 140, etc. The channel subscription module 135 may identify users that are social contacts of a first user based on the characteristics of the user inactions. For example, a first user and another user that is not connected to the first user on the content sharing platform 120 may exchange emails on a frequent basis. The channel subscription module 135 may then determine that the other user is a social contact of the first user (e.g., based on an affinity score between the users exceeding a threshold value). The channel subscription module 135 may use any combination of algorithms, functions, operations, actions, etc., to analyze user interactions and identify social contacts of a user. For example, the channel subscription module 135 may analyze interactions between the users on the social connection platform 140, via emails of the email platform 150, or via telephone calls, text messages, and so on of the mobile platform 160, to name a few examples.

In one implementation, the users identified as social contacts of the first user are not connected to the first user on the content sharing platform 120. For example, the first user is not subscribed on the content sharing platform 120 to the users identified as social contacts of the first user.

When the channel subscription module 135 identifies one or more social contact users of a first user, the channel subscription module 135 then contacts the social contact users to request channel subscription recommendations for the first user. In one implementation, the channel subscription module 135 sends an email to the social contact user. In another implementation, the channel subscription module 135 may send a notification or alert to the social contact user via an application of the channel subscription module 135. The channel subscription module 135 may provide a list of the social contact user's current subscriptions on the content sharing platform 120, and allow the social contact user to select channels from this list that the social contact user believes the first user would be interested in.

When the social contact user has provided channel subscription recommendations for the first user, the channel subscription module 135 sends these recommendations to the first user as suggested channel subscription recommendations. In one implementation, the channel subscription module 135 sends an email to the first user listing the channel subscription recommendations. In another implementation, the channel subscription module 135 may send a notification or alert to the first user via an application of the channel subscription module 135 listing the channel subscription recommendations. The channel subscription module 135 may wait (e.g., for a predetermined time interval) until receiving all channel suggestions from social contact users, and then combine all received suggestions into a single list for the first user. The first user may select one or more recommendations from the list, which are then communicated to the channel subscription module 135. The channel subscription module 135 may then subscribe the first user to the channels that the first user indicated they wished to be subscribed.

Although implementations of the disclosure are discussed in terms of content sharing platforms and subscriptions to channels of the content sharing platform, implementations may also be generally applied to any type of social network providing connections between users. Implementations of the disclosure are not limited to content sharing platforms that provide channel subscriptions to users.

Figure 2:
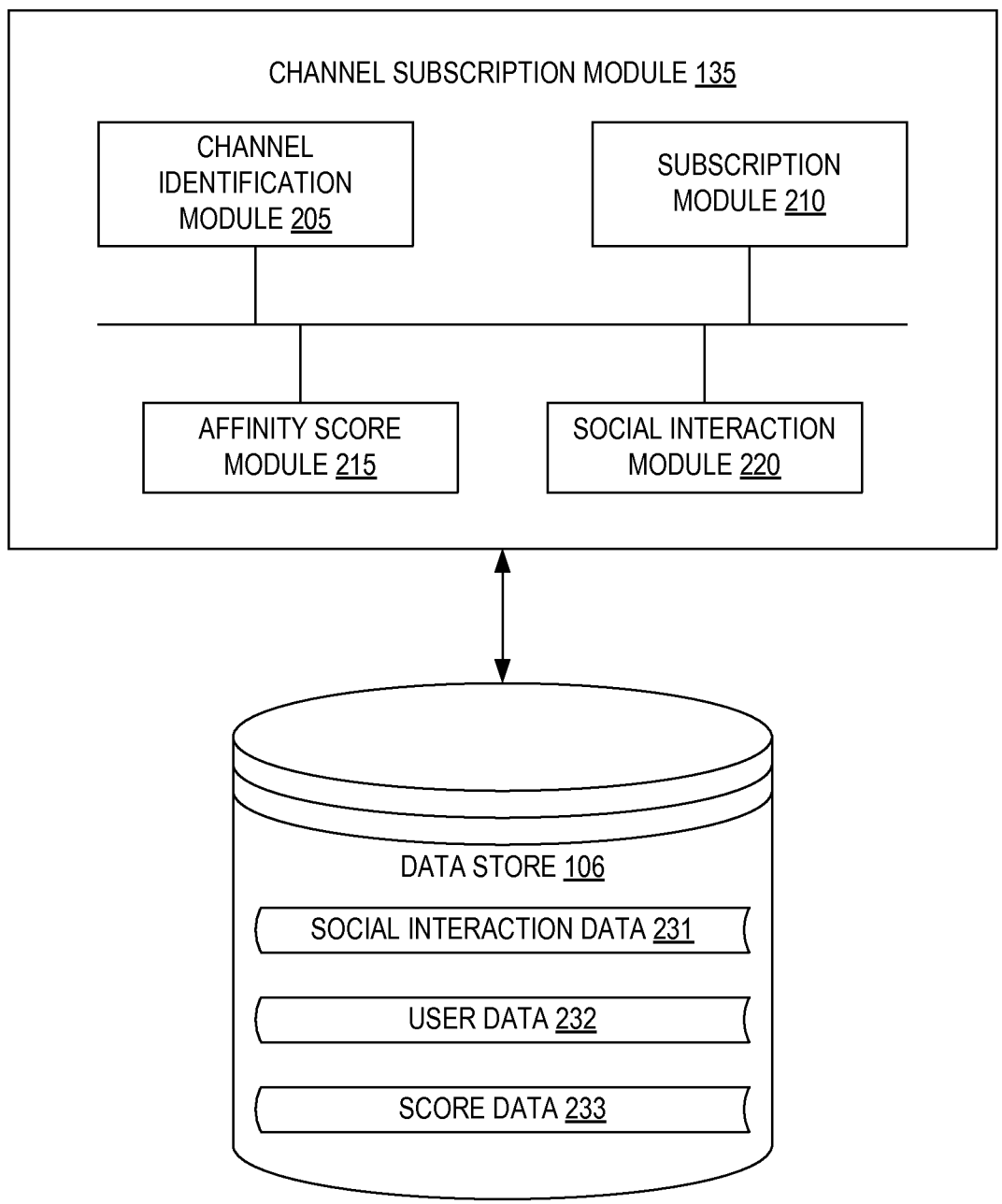
FIG. 2 is a block diagram illustrating a channel subscription module, in accordance with one implementation of the present disclosure.

FIG. 2 is a block diagram illustrating a channel subscription module 135, in accordance with one implementation of the present disclosure. The channel subscription module 135 includes a channel identification module 205, a subscription module 210, an affinity score module 215, and a social interaction module 220. More or less components may be included in the channel subscription module 135 without loss of generality. For example, two of the modules may be combined into a single module, or one of the modules may be divided into two or more modules. In one implementation, one or more of the modules may reside on different computing devices (e.g., different server computers).

The channel subscription module 135 is communicatively coupled to the data store 106. For example, the channel subscription module 135 may be coupled to the data store 106 via a network (e.g., via network 105 as illustrated in FIG. 1). In another example, the channel subscription module 135 may be coupled directly to a server where the channel subscription module 135 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes interaction data 231, user data 232, and score data 233.

In one implementation, the social interaction module 220 may gather and maintain interaction data 231 between users of a content sharing platform, such as content sharing platform 120 of FIG. 1. In one implementation, the social identification module 220 may communicate with different platforms (e.g., a content sharing platform, a social connection platform, an email platform, a mobile platform, etc.) and may collect account information, personal information, and/or activity information pertaining to groups of users and may store the information in user data 232. Social interaction module 220 may utilize the user data 232 to generate interaction data 231. Interaction data 231 may include data, information, and/or records of interactions (e.g., mode of communication, frequency of communications, etc.) between users obtained from different platforms (e.g., a social connection platform, an email platform, a chat platform, a mobile platform, etc.). For example, the interaction data 231 may include data such as emails, posts, chat messages, telephone calls, text messages, interactions on other social connection platforms, etc., between different users.

The affinity score module 215 may obtain (e.g., may determine or calculate) an affinity score between two users that are not connected on the content sharing platform. In one implementation, the interaction module 220 may store the affinity scores in the score data 233 of the data store 106. The affinity score module 215 may determine the affinity score by taking into consideration the interaction data 231 obtained and stored by social interaction module 220. For example, the affinity score module 215 may determine multiple individual affinity scores between two users, with each individual affinity score associated with one type of mode of communication (e.g., an individual affinity score of telephone calls, an individual affinity score for text messages, an individual affinity score for social connection platform interactions, and so on). These multiple individual affinity scores between two users may then be combine to generate an overall affinity score between the two users, with different weights or algorithms applied to the individual affinity scores based on an importance to be applied to the types of modes of communication. Other weights may also be applied to affinity scores based on factors such a frequency and duration of communications and content of the communications. In one implementation, the affinity score module 215 may store the obtained affinity scores in the score data 233 of the data store 106.

In one implementation, the channel identification module 205 may communicate with users of the content sharing platform to obtain channel subscription recommendations for a target user of the content sharing platform. For example, the channel identification module 205 may identify other users with which a target user has an affinity score over a certain threshold or may identify the users with which the target user has the highest affinity scores (e.g., the top ten affinity scores).

The channel identification module 205 then obtains channel subscription recommendations for the target user by contacting each of the identified other users. For each identified other user, the channel identification module 205 may send an email or other notification or alert to the identified other users providing a list of channel subscriptions of the identified other user and requesting that the other user select one or more of those channel subscriptions that the identified user believes the target user may be interested. In one implementation, an initial contact of the identified other user may inform the other user that the target user recently joined the content sharing platform (or does not have many subscriptions) and could use recommendations for channel subscriptions. The identified user may then be able to select a link or perform another action to be taken to a graphical user interface (GUI) of the content sharing platform that lists the channel subscriptions of the other user and allows the other user to select and submit those channels that the other users would like to recommend to the target user. In some implementations, the identified other user may also be provided with an input mechanism to enter in a channel recommendation to which the identified other user is not subscribed to, but believes the target user would be interested in.

The channel identification module 205 may then provide channel recommendations to the target user based on the feedback received from the identified other users. In one implementation, the channel identification module 205 contacts the target user each time an identified other user provides channel recommendations in response to being contacted by the channel identification module 205. The channel identification module 205 may send the target user an email or notification/alert informing the target user that the other user has been identified as a social contact of the target user and has provided one or more channel subscription recommendations. The one or more channel subscription recommendations may be listed in the initial contact to the target user or may be presented in a GUI accessed from a link of the initial contact to the target user.

In another implementation, the channel identification module 205 may wait a predetermined time interval to receive feedback from all of the identified other users, and after that time interval has elapsed combine all of the received channel recommendations into a single recommendation list for the target user. This single recommendation list may be provided in an initial contact of the target user, or may be presented in a GUI accessed from a link of the initial contact to the target user.

In the recommendation list of channels provided to the target user, the channel identification module 205 may also include the channel(s) associated with (e.g., created by/owned by) the recommending identified other user(s).

Figure 3:
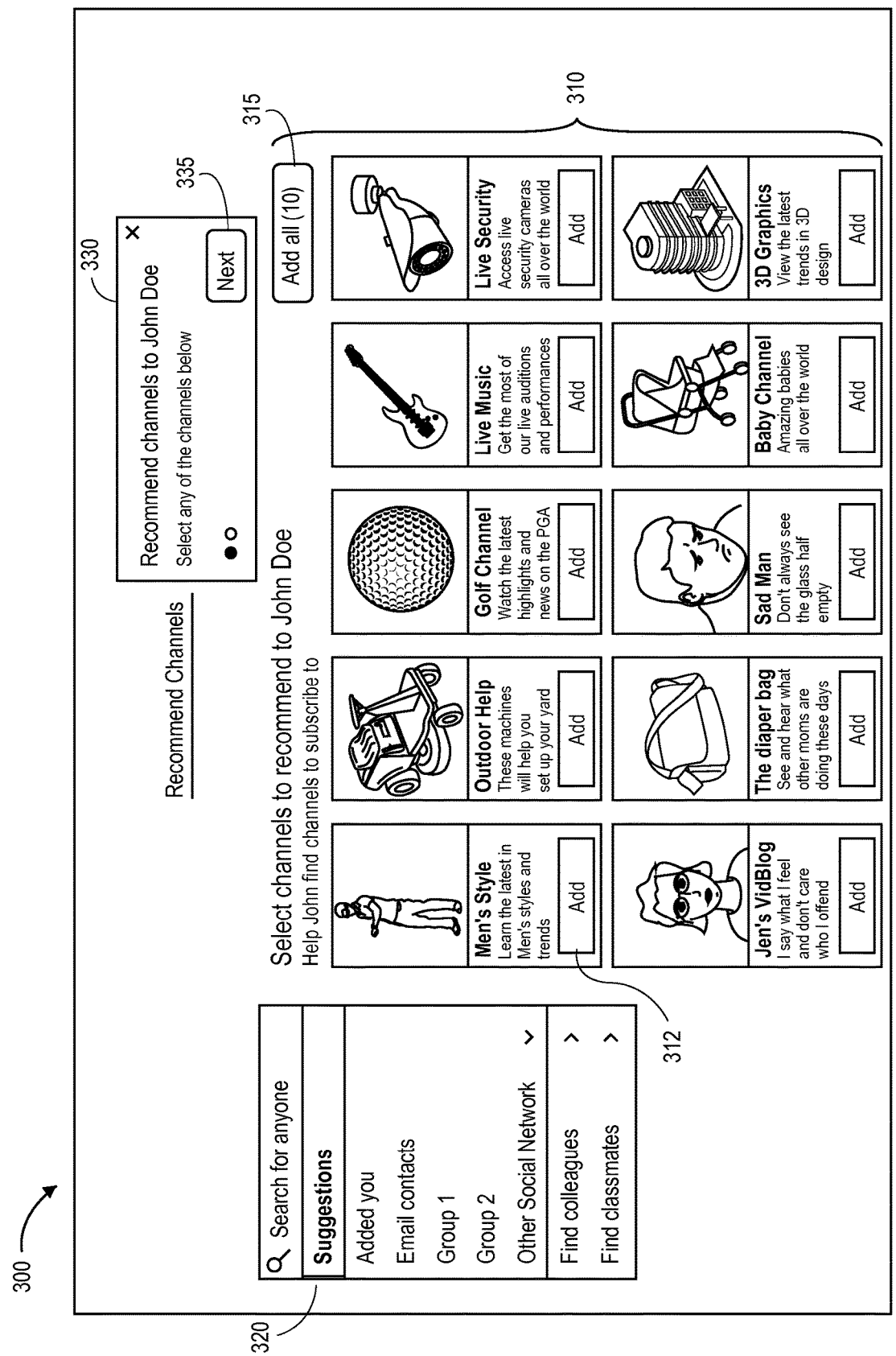
FIG. 3 illustrates an example screenshot of a channel recommendation request GUI presented to a user of a content sharing platform that is identified as a social contact of another user having minimal channel subscriptions, according to implementations of the disclosure.
Figure 4:
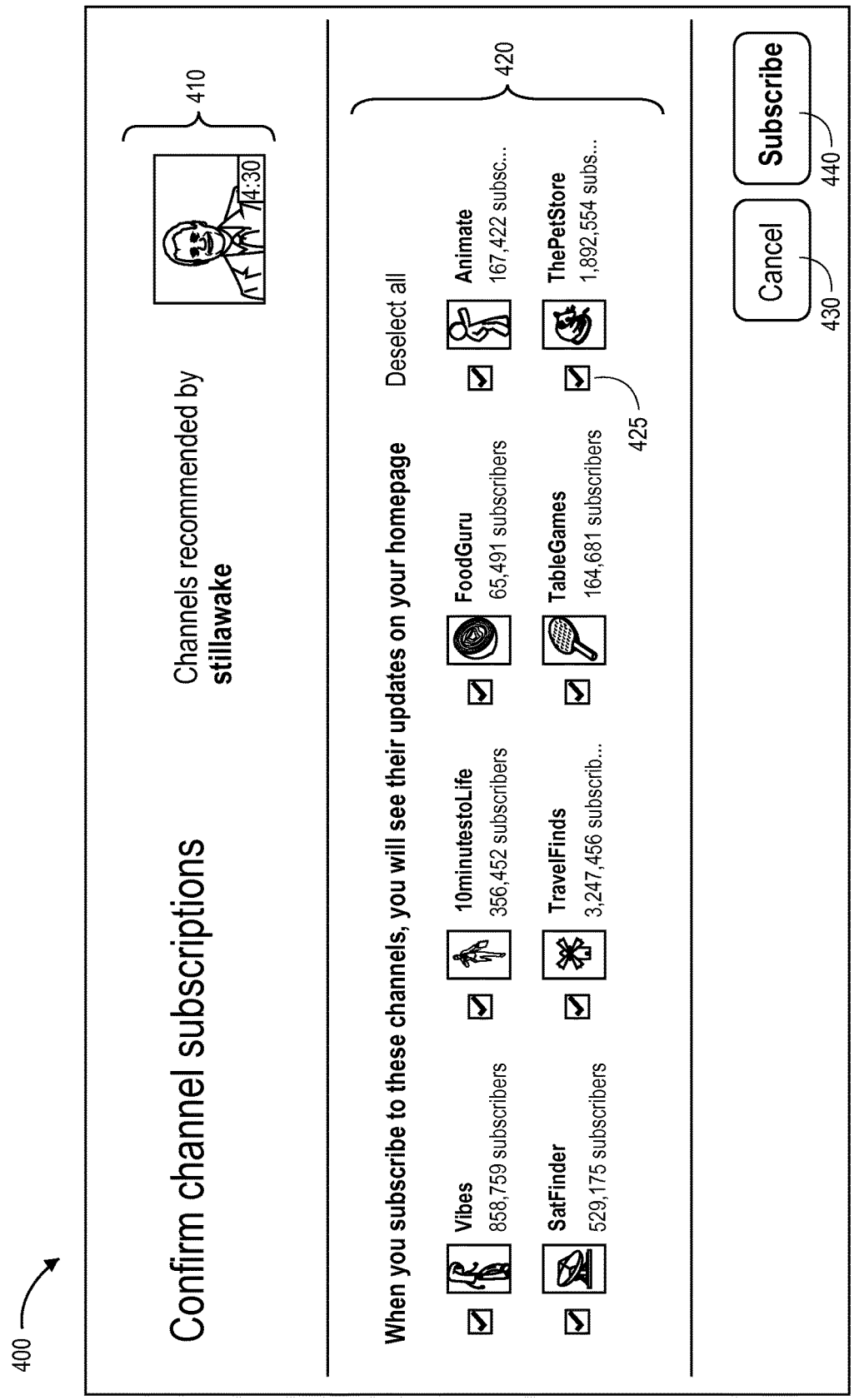
FIG. 4 illustrates an example screenshot of a channel recommendation GUI providing personalized channel recommendations for a content sharing platform to a user obtained from social contacts of the user according to implementations of the disclosure.

The target user may then select one or more channels from the recommended channels presented to the target user. The channel subscription module 210 may subscribe the target user to the one or more of the identified channels that the target user indicated he or she wished to subscribe. FIG. 3 and FIG. 4 described below depict example screenshots of GUIs provided to the identified other users and the target user to obtain and provide channel subscription recommendations for the target user.

In some implementations, the functionality of the channel subscription module 135 and data store 106 described in FIG. 2 may be performed wholly, or in part, on a client device.

FIG. 3 illustrates an example screenshot of a channel recommendation request GUI 300 presented to a user (e.g., a social contact user) of a content sharing platform that is identified as a social contact of another user (e.g., a new user) having minimal channel subscriptions, according to implementations of the disclosure. In implementations of the disclosure, the social contact user to which the GUI 300 is presented is not connected to the new user on the content sharing platform. FIG. 3 illustrates an example screenshot of a channel recommendation request GUI 300 provided to the social contact user as a servlet, an applet, an API, or as any other type of GUI provided by a content sharing platform.

Channel recommendation request GUI 300 may include a plurality of channel suggestions for the social contact user to select from to recommend to the new user. As shown in GUI 300, the new user is identified as "John Doe". The content sharing platform may have previously determined that the social contact user is a social contact of John Doe outside of the content sharing platform, per the description provided above with respect to FIGS. 1 and 2. The content sharing platform may then provide or present channel recommendation request GUI 300 to the social contact user to request channel subscription recommendations for the new user.

Channel recommendation request GUI 300 may include a plurality of channel suggestions 310. In one implementation, the channel suggestions are existing subscriptions, and/or based on existing subscriptions, of the social contact user. The social contact user may be prompted by pop-up window 330 to select one or more of the channel subscription suggestions 310. The social contact user may select an 'add' button 312 to select individual suggestions or may select all of the suggestions using 'add all' button 315. The social contact user may also search for channels using menu 320. In some implementations, the social contact user may be provided with options to perform free text searching for a channel, or may be provided with other categories (e.g., channels that have subscribed to the social contact user, channels associated with email contacts of the social contact user, channels associated with contacts from another social network of the social contact user, and other groupings).

The social contact user may then submit their selected channel subscription recommendations by selecting the 'next' button 335 in pop-up window 330. Other GUIs and GUI arrangements to obtain channel subscription recommendations from a social contact user may be possible in implementations of the disclosure, and implementations are not limited to the GUI 300 depicted in FIG. 3.

FIG. 4 illustrates an example screenshot of a channel recommendation GUI 400 providing personalized channel recommendations for a content sharing platform to a user, where the personalized channel recommendations are obtained from social contacts of the user according to implementations of the disclosure. FIG. 4 illustrates an example screenshot of a channel recommendation GUI 400 provided to a user as a servlet, an applet, an API, or as any other type of GUI provided by a content sharing platform.

Channel recommendation GUI 400 may include an indication of another user 410 (e.g., a social contact) of the content sharing platform from which the channel recommendations 420 of the channel recommendation GUI 400 are obtained. The channel recommendations 410 may include a title of the channel, a thumbnail image obtained from the channel, and other descriptive information. In addition, a radio button 425 may be provided with each channel recommendation 410. In some implementations, other selection mechanisms to select a channel recommendation may be used.

After a user has selected one or more of the channel recommendations, a 'subscribe' button 440 may be selected to submit the channels that the user wishes to subscribe to. If the user does not wish to make a selection of a channel recommendation, a 'cancel' button 430 may be selected by the user. In one implementation, as a default presentation, the channel recommendations 410 are all selected for the user's convenience. The user may select a 'deselect all' button 450 to remove the channel recommendation selections and select the individual channels that the user prefers to subscribe to. Other GUIs and GUI arrangements to provide channel subscription recommendations to a user may be possible in implementations of the disclosure, and implementations are not limited to the GUI 400 depicted in FIG. 4.

FIG. 5 is a flow diagram illustrating a method 500 for generating connection recommendations for a social network from social contacts according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by channel subscription module 135, as shown in FIG. 1.

Referring to FIG. 5, at block 510, method 500 begins at block 510 where a first user of a content sharing platform is identified. In one implementation, the first user is a new user to the content sharing platform and does not have any channel subscriptions on the content sharing platform. In another implementation, the first user is a user having a number of subscriptions less than a threshold number of subscriptions. At block 520, social contacts of the first user are identified, where the social contacts are also users of the content sharing platform and are not connected to the first user on the content sharing platform. In one implementation, the first user not being connected to the social contact denotes that the first user is not subscribed to channels of the social contacts on the content sharing platform.

At block 530, an affinity score between the first user and each of the identified social contacts is determined. Because the first user and the identified social contacts are not connected on the content sharing platform, the affinity score may be based on interactions between the first user and each of the social contacts that occurred externally to the content sharing platform. For example, the interactions may have occurred on another social connection platform, on an email platform, or on a mobile platform. The affinity score is an indication of a level of interaction between the two users outside of the content sharing platform.

At block 540, one or more of the identified social contacts are selected based on the determined affinity score. For example, the top X social contacts with the highest affinity scores are selected, where X is a predetermined number configured by an administrator of the content sharing platform. In another example, the social contacts with an affinity score above a threshold affinity score value (configured by an administrator of the content sharing platform) are selected.

Then, at block 550, each of the selected social contacts is contacted by the content sharing platform to request channel recommendations for the first user. In one implementation, an email is sent to each selected social contact requesting the channel recommendations for the first user. In another implementation, a notification or alert is provided to each selected social contact via an application of the content sharing platform. The content sharing platform may provide a list of the social contact's current subscriptions on the content sharing platform, and allow the social contact to select channels from this list that the social contact believes the first user may be interested.

At block 560, the first user is provided the channel recommendations received from the selected social contacts as suggestions for channel subscriptions for the first user. Then, at block 570, the first user is subscribed to one or more channels indicated by the first user from the provided channel subscription suggestions.

Figure 6B:
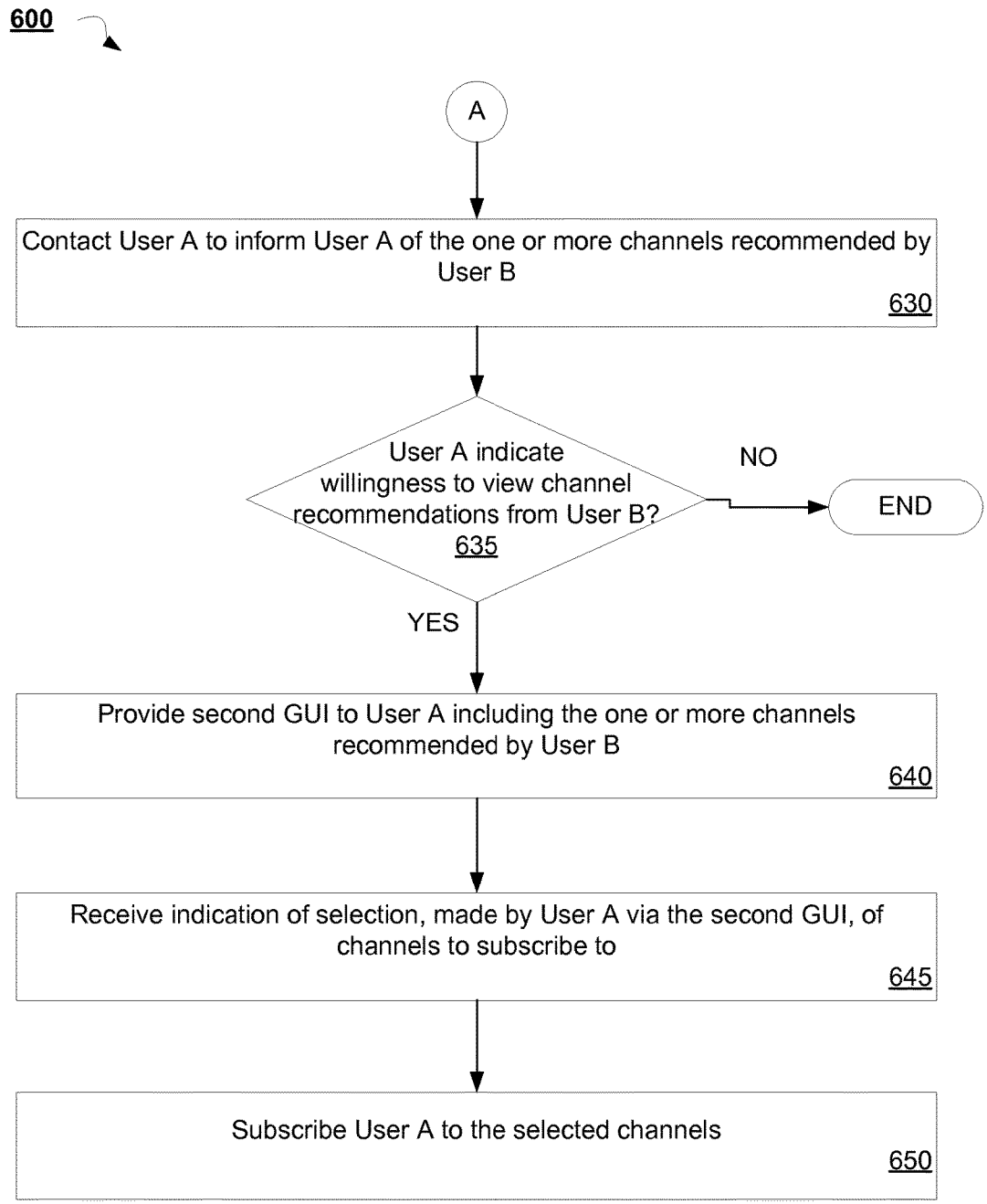

FIGS. 6A and 6B are flow diagrams illustrating another method 600 for generating connection recommendations for a social network from social contacts according to an implementation of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by channel subscription module 135, as shown in FIG. 1.

Referring to FIG. 6A, method 600 begins at block 610 where the channel subscription module determines that a user B is a social contact of a user A external to the content sharing platform. In one implementation, user A is not connected to User B on the content sharing platform. Then, at block 610, user B is contacted to request channel recommendations for user A for the content sharing platform. At decision block 615, it is determined whether user B indicates a willingness to provide the channel recommendations for user A. For example, the channel subscription module may email or otherwise notify (e.g., alert or application notification) user B with a request to provide channel recommendations for user A because user A is new to the content sharing platform and because user B has been identified as a social contact of user A. User B may indicate his or her willingness to provide channel recommendations for user A by selecting a link in the email, where user B is instructed to select the link as a next step to providing the recommendations for user A.

If user B does not indicate his or her willingness to provide channel recommendations at decision block 615, then method 600 ends. On the other hand, if user B does indicate his or her willingness to provide the channel recommendations, then method 600 proceeds to block 620 where a first GUI is provided to user B. In one implementation the first GUI is an applet or pop-up window or other type of page that lists user B's current channel subscriptions on the content sharing platform. For example, the first GUI is the same as channel recommendation request GUI 300 described with respect to FIG. 3. At block 630, an indication of selection by user B of one or more channels is recommended for user A is received via the first GUI.

Referring now to FIG. 6B, method 600 proceeds to block 630 where user A is contacted to inform him or her of the one or more channel recommended by user B. In one implementation, the channel subscription module sends an email to user A informing user A that user B has been identified as a social contact of user A and has also provided channel recommendations that user B believes user A may like to subscribe. At decision block 635, it is determined whether user A indicates a willingness to view the channel recommendations from user B. If not, the method 600 ends. On the other hand, if user A does indicate a willingness to view user B's channel recommendations, the method 600 proceeds to block 640.

In one implementation, the channel subscription module may email or otherwise notify (e.g., alert or application notification) user A with a request to view channel recommendations provided by user B for user A. User A may indicate his or her willingness to view channel recommendations from user B by selecting a link in the email that is described as taking user A to the channel recommendations provided by user B.

At block 640, a second GUI is provided to user A that includes the one or more channel recommendations made by user B. In one implementation, the second GUI is the same as channel recommendation GUI 400 described with respect to FIG. 4. At block 645, an indication of a selection made by user A of channels to subscribe to is received via the second GUI. Then, at block 650, the channel subscription module subscribes user A to the selected channels indicated at block 645.

Figure 7:
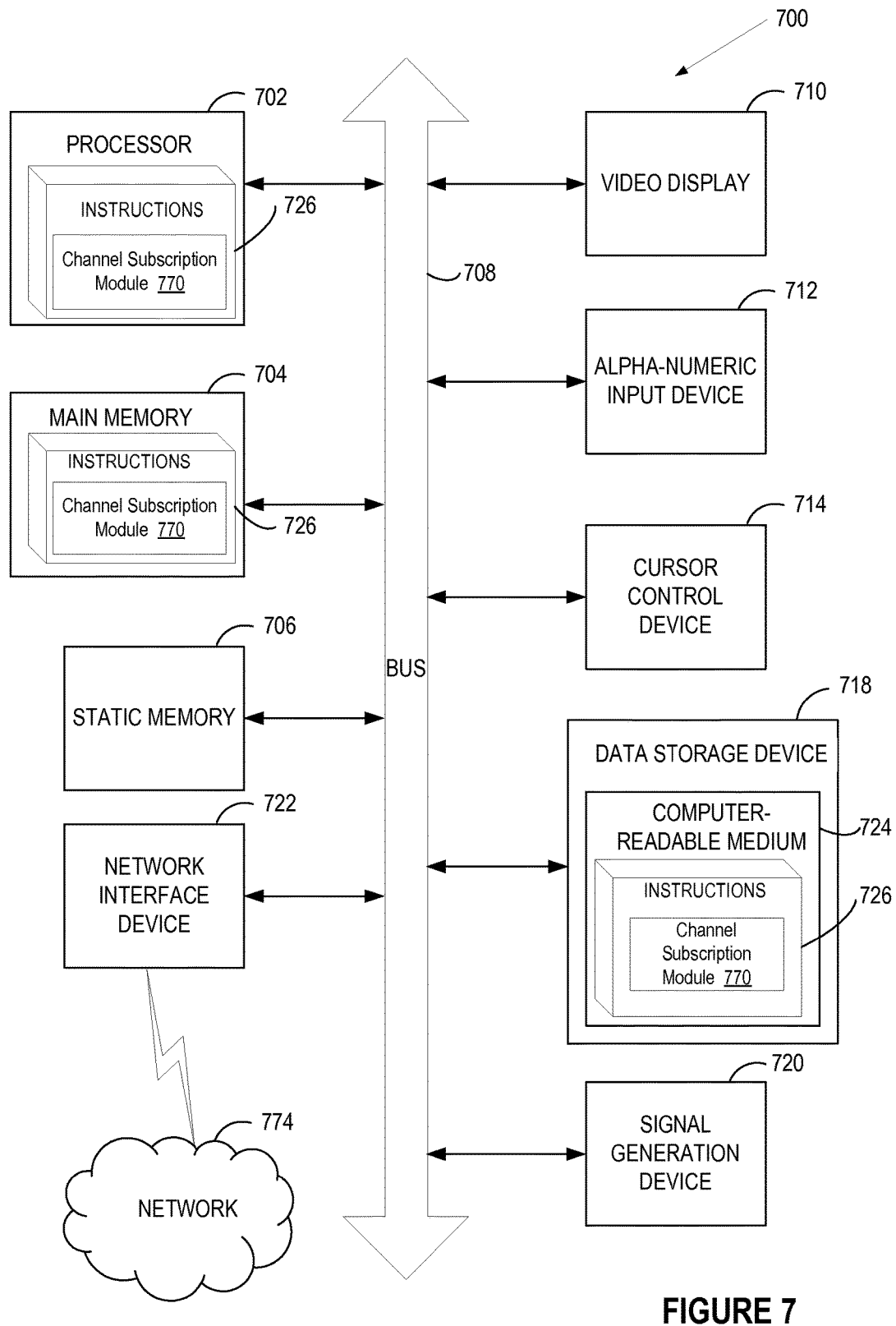
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one implementation, the instructions 726 include instructions for a channel subscription module 750, which may correspond to channel subscription module 135 of FIG. 1, and/or a software library containing methods that call a channel subscription module for generating connection recommendations for a social network from social contacts. While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying, by a processing device, a first user of a content sharing platform, the first user associated with a first client device;
    selecting a second user of the content sharing platform based on an affinity score between the first user and the second user, wherein the first user and the second user are not connected to each other on the content sharing platform, and wherein the affinity score between the first user and the second user is based on interactions between the first user and the second user via one or more communication systems external to the content sharing platform;
    sending, to a second client device of the second user, a request for recommended channel subscriptions on the content sharing platform for the first user, wherein the request comprises a pre-populated list of channel subscriptions associated with the second user;
    receiving, from the second client device via the pre-populated list without interaction by the first user, the recommended channel subscriptions for the first user; and
    providing, to the first client device of the first user, at least a portion of the list of recommended channel subscriptions as suggestions for channel subscriptions on the content sharing platform for the first user.

2. The method of claim 1, wherein the identifying the first user further comprises determining that a number of channel subscriptions of the first user on the content sharing platform is less than a channel subscription threshold.

3. The method of claim 1, wherein the one or more communication systems external to the content sharing platform comprise at least one of a social connection network external to the content sharing platform, electronic mail communications, telephone communications, short message service (SMS) communications, or Multimedia Message Service (MMS) communications.

4. The method of claim 1, wherein the affinity score is further based on a frequency of the number of connections between the first user and the second user.

5. The method of claim 1, wherein a channel subscription comprises a subscription to a channel of the content sharing platform.

6. The method of claim 1, further comprising receiving, from the first client device, a selection of a channel subscription from the list of recommended channel subscriptions.

7. The method of claim 1, wherein the affinity score between the first user and the second user exceeds an affinity score threshold.

8. The method of claim 1, wherein the affinity score between the first user and the second user comprises a top predetermined number of affinity scores for the first user.

9. A non-transitory machine-readable storage medium storing instructions which, when executed, cause a data processing system to perform operations comprising:
    identifying one or more users of a social network as social contact users of a first user of the social network, wherein the first user is not connected to the social contact users on the social network, and wherein the first user is associated with a first client device;
    selecting one or more of the social contact users based on an affinity score between the first user and ones of the social contact users, and wherein the affinity score between the first user and the ones of the social contact users is based on interactions between the first user and the ones of the social contact users via one or more communication systems external to the content sharing platform;
    sending, to selected client devices of the selected one or more social contact users, requests for recommended connections on the social network for the first user, wherein the requests comprise pre-populated lists comprising connections associated with the selected one or more social contact users;
    receiving, from the selected client devices of the selected one or more social contact users via the pre-populated lists without interaction by the first user, the recommended connections for the first user; and
    providing, to the first client device of the first user, a list of the received recommended connections as suggestions for connections that the first user can make on the social network.

10. The non-transitory machine-readable storage medium of claim 9, wherein the one or more communication systems external to the content sharing platform comprise at least one of a social connection network external to the content sharing platform, electronic mail communications, telephone communications, Short Message Service (SMS) communications, or Multimedia Message Service (MMS) communications.

11. The non-transitory machine-readable storage medium of claim 9, wherein the affinity score is further based on a frequency of the number of connections between the first user and the social contact user.

12. The non-transitory machine-readable storage medium of claim 9, wherein a recommendation comprises a subscription to a channel of the social network.

13. The non-transitory machine-readable storage medium of claim 9, wherein the affinity score between the first user and the selected social contact users exceeds an affinity score threshold.

14. The non-transitory machine-readable storage medium of claim 9, wherein the operations further comprise:

receiving, from the first client device, a selection of a connection of the recommended connections from the list of recommended connections; and subscribing the first user to the selected connection on the social network.

15. A system comprising:

a processing device;

a memory coupled to the processing device, the memory to store a plurality of content items; and a channel subscription module executable by the processing device from the memory, the channel subscription module to:

identify a first user of a content sharing platform, the first user associated with a first client device;

select a second user of the content sharing platform based on an affinity score between the first user and the second user, wherein the first user and the second user are not connected to each other on the content sharing platform, and wherein the affinity score between the first user and the second user is based on interactions between the first user and the second user via one or more communication systems external to the content sharing platform;

sending, to a second client device of the second user, a request for recommended channel subscriptions on the content sharing platform for the first user, wherein the request comprises a pre-populated list comprising channel subscriptions associated with the second user;

receive, from the second client device via the pre-populated list without interaction by the first user, the recommended channel subscriptions for the first user;

provide, to the first client device of the first user, at least a portion of the recommended channel subscriptions as suggestions for channel subscriptions on the content sharing platform for the first user; and receive, from the first client device of the first user, a selection of the channel subscriptions from the list of recommended channel subscriptions.

16. The system of claim 15, wherein the one or more communication systems external to the content sharing platform comprise at least one of a social connection network external to the content sharing platform, electronic mail communications, telephone communications, Short Message Service (SMS) communications, or Multimedia Message Service (MMS) communications, wherein the affinity score is further based on a frequency of the number of connections between the first user and the second user.

17. The system of claim 15, wherein the channel subscription module further to send, to the second client device, instructions to select the channel subscriptions from the pre-populated list to recommend to the first user.

18. The system of claim 15, wherein the affinity score between the first user and the second user exceeds an affinity score threshold.

19. The system of claim 15, wherein the affinity score between the first user and the second user comprises a top predetermined number of affinity scores for the first user.

20. The system of claim 15, wherein a channel subscription comprises a subscription to a channel of the content sharing platform.

* * * * *